United States Patent [19]

Rance

[11] 4,405,893

[45] Sep. 20, 1983

[54] PULSE WIDTH REGULATOR

[75] Inventor: John E. Rance, Redondo Beach, Calif.

[73] Assignee: Gulton Industries, Inc., Hawthorne, Calif.

[21] Appl. No.: 280,205

[22] Filed: Jul. 6, 1981

[51] Int. Cl.³ ............................................. H02P 13/32
[52] U.S. Cl. ................................... 323/271; 323/289; 323/290
[58] Field of Search ............................... 323/282–290, 323/351, 271, 272

[56] References Cited

U.S. PATENT DOCUMENTS 3,530,368  9/1970  Gerard ................................ 323/286
4,313,155  1/1982  Bock et al. ............................ 363/21

FOREIGN PATENT DOCUMENTS 2445125  4/1976  Fed. Rep. of Germany ........ 363/26
441632  12/1974  U.S.S.R. ............................... 323/351

OTHER PUBLICATIONS

Proceedings of the 6th National Solid-State Power Conversion Conference, pp. B1-1 to B1-6, May 1979.

Primary Examiner—William H. Beha, Jr.
Attorney, Agent, or Firm—Blakely, Sokoloff, Taylor & Zafman

[57] ABSTRACT

A high voltage, pulse width regulator circuit wherein the input voltage may be up to twice the voltage rating of pass or switching transistors used in the circuit is disclosed. This is accomplished by dividing the input unregulated DC voltage or full wave rectified AC voltage in half. The divided voltage is placed on each of two input lines. The pulse width regulator utilizes two transistors or other semiconductor switches, each receiving one half the input voltage. To insure a properly regulated voltage on the output and to avoid the possibility of one of the transistors receiving more than one half the input voltage, means are provided for insuring that the voltage drop across either transistor will be limited to approximately one half the input voltage at all times. By utilizing the teachings of this invention, a pulse width regulator capable of handling an input voltage of at least twice the rating of the transistors employed in the regulator is obtained.

4 Claims, 3 Drawing Figures

PULSE WIDTH REGULATOR

PRIOR ART STATEMENT

Pulse width regulators, also known as buck regulators, are well known circuits for converting unregulated DC voltages or full wave rectified AC voltages to regulated DC voltages. For example, referring to FIG. 2, unregulated DC voltage appearing on line 11 is switched on and off by transistor Q1' which is turned on and off by the drive circuitry 15 through lead 16 to the base of the transistor. The resulting pulse on line 17 is integrated by inductor L1' and capacitor C3' resulting in regulated DC on line 18. When the transistor is off, current flows through the loop formed by capacitor C3', diode D1' and inductor L1'. The inductor stores energy when the transistor is in its on state which is released when the transistor is switched off. Drive circuitry 15 detects the voltage on line 18 and turns the transistor on and off thereby maintaining the voltage at a predetermined level. The DC voltage input to such a circuit is limited by the collector emitter breakdown voltage ($BV_{ceo}$) or the collector base voltage ($V_{cb}$) of the transistor.

SUMMARY OF THE INVENTION

A high voltage, pulse width regulator circuit wherein the input voltage may be up to twice the voltage rating of pass or switching transistors used in the circuit is disclosed. This is accomplished by dividing the input unregulated DC voltage or full rectified AC voltage in half. The divided voltage is placed on each of two input lines. The pulse width regulator utilizes two transistors or other semiconductor switches, each receiving one half the input voltage. Current drive circuitry means is used to generate signals to the base of the two transistors turning the transistors on and off at a rate dependent upon the desired output voltage. Ideal transistors would switch on and off at precisely the same times. However, inasmuch as transistors are not ideal devices, to avoid the possibility of one of the transistors receiving more than one half the input voltage, means are provided for insuring that the voltage drop across either transistor will be limited to approximately not more than one half the input voltage at all times. By utilizing the teachings of this invention, a pulse width regulator capable of handling an input voltage substantially larger than the rating of the transistors employed in the regulator is obtained.

DETAILED DESCRIPTION OF THE INVENTION

A pulse width or buck regulator for regulating high voltage, unregulated DC or full wave rectified AC voltage such that the input voltage may be up to twice the rating of transistors used in the circuit, is disclosed. The input voltage is divided in half. Two parallel circuits each receive one half of the divided input voltage and produce a single regulated D.C. voltage. The regulated DC voltage output of the regulator may be used in any application requiring a regulated DC power source.

Figure 1:
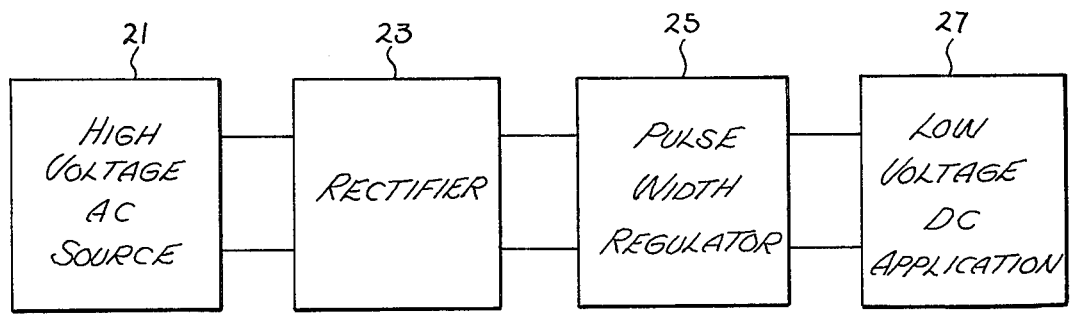
FIG. 1 is a block diagram showing the relationships of a pulse width regulator to a high voltage AC source and low voltage DC application.
Figure 2:
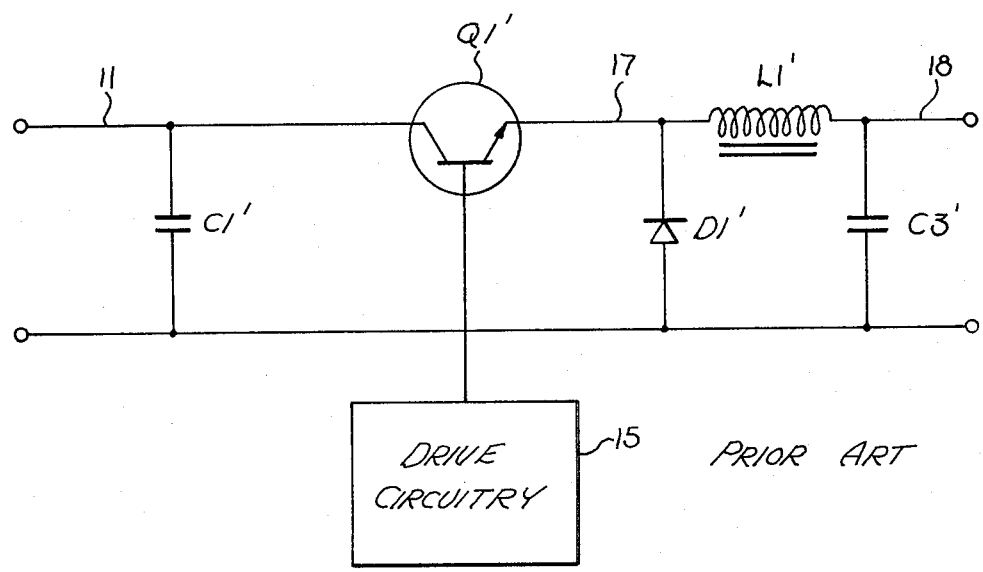
FIG. 2 is a schematic diagram of a prior art pulse width regulator.

Referring to FIG. 1, a block diagram of a typical application of a pulse width regulator is shown. A high voltage AC source 21, for example, 115-240 V.A.C. at 50-400 Hz is fed into a rectifier 23. The rectifier 23, for example, a diode bridge, recitifies the AC signal converting it into a full-wave rectified AC voltage. This voltage (unregulated DC) is then regulated by the pulse width regulator 25 producing regulated DC voltage at a predetermined voltage level for use by any lower voltage DC application 27.

Generally, a pulse width regulator receives, as an input, an unregulated DC voltage. Switch means, controlled by drive circuitry which senses the output voltage and generates signals opening or closing the switch at a rate dependent on the desired output voltage, produces pulses from the input source. The pulses are input to integrator means which produces a regulated DC output as a function of the pulse widths input to the integrator means.

Figure 3:
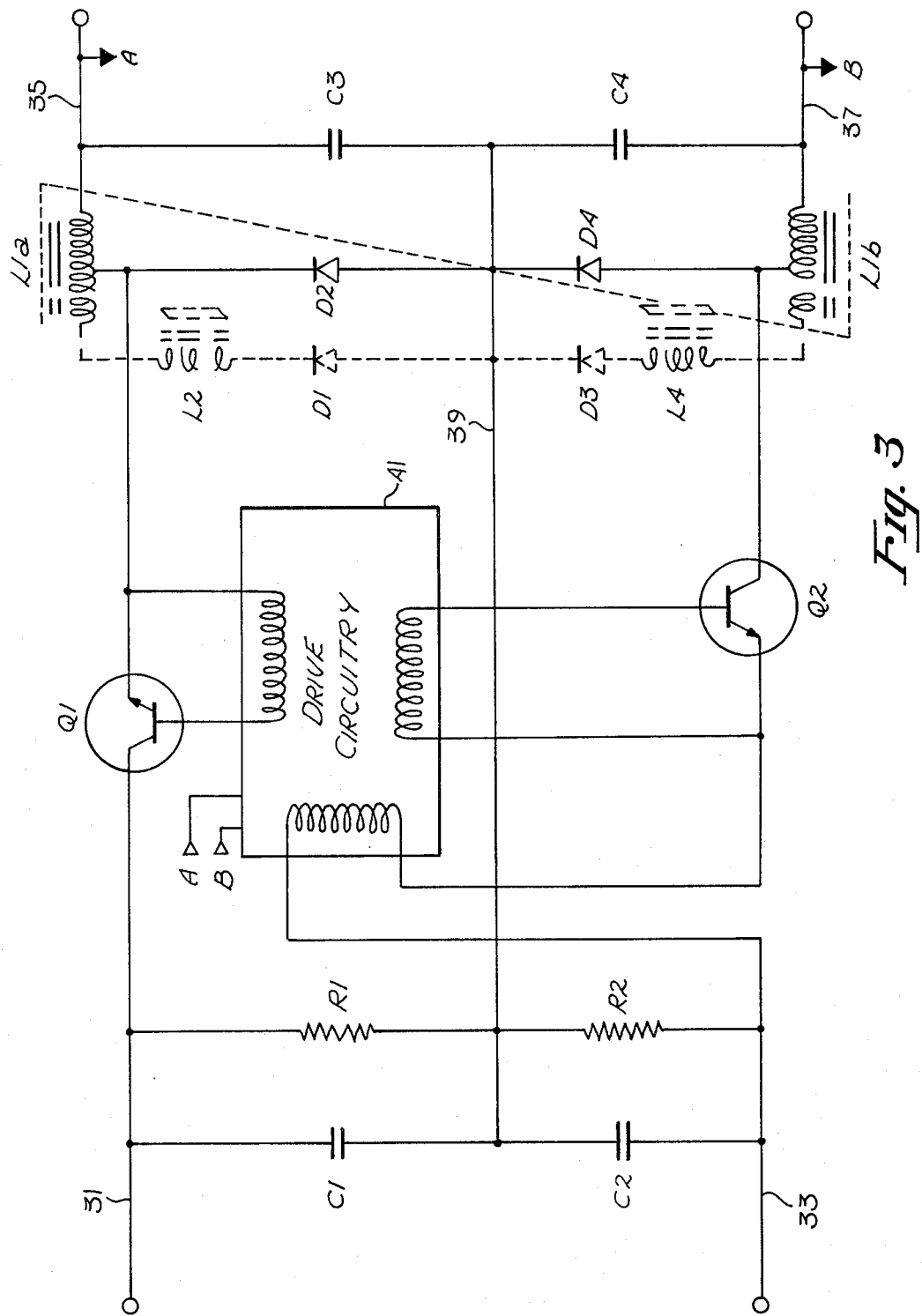
FIG. 3 is a schematic diagram of an embodiment of the subject pulse width regulator.

Referring now to FIG. 3, the circuit details of a pulse width regulator will now be described. An unregulated DC input voltage appearing on lines 31 and 33 is divided between two transistors Q1 and Q2 by capacitor C1 connected in series to capacitor C2 and resistor R1 connected in series to resistor R2. The capacitor/resistor pairs are in parallel and coupled at respective ends to input lines 31 and 33. The resistors R1 and R2 draw approximately 10 times as much current as the leakage current of capacitors C1 and C2, thereby insuring equal voltage division where the regulator is in the "no load" condition, i.e., when the transistors Q1 and Q2 are off.

When the transistors are off, at steady-state under load conditions, inductors L1a and L2b, coupled to the outputs of transistor Q1 and Q2 respectively, are discharging through diodes D2 and D4 respectively. (Chokes L1a and L1b are wound on a single core, insuring an equal voltage division across capacitors C3 and C4 while inductors L1a and L1b are charging or discharging.) The loop comprising inductors L1a and L1b, capacitors C3 and C4 and diodes D2 and D4, maintains the voltage on output lines 35 and 37 while the inductors are discharging until the transistors are turned on. Line 39 couples the common points of capacitors C3 and C4, and diodes D2 and D4 on the output side with the common points of capacitors C1 and C2 and resistors R1 and R2 on the input side, insuring that the voltage drop across either transistor Q1 or Q2, will be limited to approximately one half the input voltage during its off time. This is necessary because transistors are not ideal devices and even if signalled to switch on or off at the same time, due to storage time characteristics, the transistors may turn on or off at different times with the transistor with the shorter storage time receiving substantially all the input voltage.

Assume now that drive circuit 41 has sensed a voltage drop on output lines 35 and 37 transistors Q1 and Q2 have been turned on and are saturated, i.e., at steady state. Current increases in the inductors L1a and L1b at a rate of: input voltage—output voltage=L di/dt. Details of drive circuit 41 will not be disclosed herein as such circuits are well known in the art. Generally, in a pulse width regulator, a current drive or other well known means is coupled to the base of the switching transistor, turning it on and off as necessary to maintain the output voltage at a predetermined level. When the transistors are on, the inductor stores the energy necessary to maintain the output current and voltage when the transistors are turned off by the drive circuit.

In a preferred embodiment, as shown in shadow line in FIG. 3, the addition of the circuit elements comprising inductors L2 and L4 and diodes D1 and D2 and using a tap configuration on inductors L1a and L2b, is incorporated to reduce the switching losses of transistors Q1 and Q2 when the transistors are switched from off to on.

As noted above, when the transistors Q1 and Q2 are off, current flows in the inductors L1a, L1b, capacitors C3, C4 and diodes D2, D4 loop. When the above described tap configuration is utilized, and the transistors are turned off, the current initially flows through diodes D2 and D4. The tap configuration of the inductor L1a, L1b, causes a voltage across the inductors L2, L4 and diodes D1, D3. Chokes L2 and L4 comprise a saturable reactor and linear inductor. For purposes of discussion, these two elements may each be viewed as two elements in series, one being the saturable reactor and one being the inductor. Initially all the voltage appears across the two saturable reactor elements until they reach saturation. Upon saturation, the current starts increasing through the linear portions of inductors L2 and L4 and diodes D1 and D3. As this current increases, the current through diodes D2, D4 decreases. When the current level through inductors L2, L4 and diodes D1, D3 reaches the level of current in inductors L1a and L1b, diodes D2 and D4 are effectively removed from the circuit. By the time transistors Q1 and Q2 turn on, diodes D2 and D4 have recovered.

Prior to the transistors Q1, Q2 turning on, current in inductors L1a, L1b flows through inductors L2, L4 and diodes D1, D3. When the transistors Q1, Q2 turns on, the voltages on the taps of inductors L1a, L1b rise to the level of the input voltage. This causes the voltage across the inductors L2 and L4 to reverse. The current flow is blocked by diodes D1 and D3 in this reverse direction, and the energy stored in the inductors L2, L4 is released in the direction of the voltage across inductors L1a, L1b. The current through transistor Q1, Q2 increases at the rate the current in inductors L2, L4 decreases, allowing the transistors to turn on at low current improving the switching losses at turn on.

To determine the inductance needed for the inductors L2, L4 to properly function in this circuit, L is solved for in the equation: $E = L\, di/dt$. The input voltage, E, and instantaneous current, di, are predetermined by the application. The time, dt, is the time to allow the transistors to turn on which, for the type of transistors employed in power circuits such as the present invention, is approximately ½ micro-second.

Thus, a pulse width regulator capable of handling an input voltage of up to twice the voltage rating of the transistor switches employed by the circuit has been described. Additionally, means for improving the switching losses of the transistor switches, has been described. Although, only one embodiment of such a circuit has been disclosed herein, it will be obvious to one skilled in the art that various changes in circuit may be made without departing from the spirit and scope of the invention as disclosed and claimed herein. For example, the input may be divided more than twice, with a corresponding number of switching means and integrator means utilized to produce the desired regulated voltage.

I claim:
1. A pulse width regulator comprising:
 (a) means for dividing an unregulated input DC voltage into a plurality of unregulated input DC voltages;
 (b) switch means including a plurality of semi-conductor switches coupled to said voltage dividing means, wherein each semi-conductor switch is adapted to switch one of said plurality of input voltages on and off to produce a plurality of pulses;
 (c) integrating means for integrating said plurality of pulses, said integrating means coupled to said switch means, whereby said pulses are converted into a regulated DC output voltage;
 (d) storage means for improving switching losses of said semi-conductor switches, said storage means comprising a plurality of saturable reactor-inductor pairs electrically connected to each other through diodes and coupled to said integrating means.

2. The pulse width regulator defined by claim 1 wherein said semi-conductor switches are switched on and off by a drive circuit coupled to said integrating means and said switch means, said drive circuit adapted to detect said output voltage and generate a plurality of switching signals for switching said semi-conductor switches on and off when necessary to maintain said output voltage at a predetermined level.

3. The pulse width regulator defined by claim 1 wherein each of said plurality of saturable reactors and inductors comprise an inductor having a single winding with a core having square loop material and linear material.

4. The pulse width regulator defined by claim 1 wherein said integrating means comprises a plurality of inductors having a common core, each inductor coupled intermediate its ends to one of said plurality of semiconductor switches, and coupled to a capacitor at an end thereof opposite the end connected to one of said plurality of saturable reactor-inductor pairs.

* * * * *